United States Patent
Blakely et al.

(10) Patent No.: US 9,379,890 B1
(45) Date of Patent: Jun. 28, 2016

(54) SYSTEM AND METHOD FOR MANAGING CRYPTOGRAPHIC KEYS

(71) Applicant: WORKIVA INC., Ames, IA (US)

(72) Inventors: Benjamin Alan Blakely, Ankeny, IA (US); Matthew Edward Sullivan, Ames, IA (US); Michael Bryan Wesner, Dubuque, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/961,113

(22) Filed: Dec. 7, 2015

(51) Int. Cl.
*H04L 29/06* (2006.01)
*H04L 9/08* (2006.01)

(52) U.S. Cl.
CPC .............. *H04L 9/0822* (2013.01); *H04L 9/083* (2013.01); *H04L 9/0825* (2013.01)

(58) Field of Classification Search
CPC ..... G06F 21/10; H04L 63/062; H04L 63/061; H04L 9/0894
USPC ................................................. 380/277, 281
See application file for complete search history.

(56) References Cited

U.S. PATENT DOCUMENTS

| | | | | |
|---|---|---|---|---|
| 5,457,746 A | * | 10/1995 | Dolphin | .............. G06F 12/1408 380/279 |
| 8,566,578 B1 | | 10/2013 | Banerjee | |
| 8,788,843 B2 | | 7/2014 | Kopasz et al. | |
| 8,799,322 B2 | | 8/2014 | deMilo et al. | |
| 9,015,469 B2 | | 4/2015 | Prince et al. | |
| 2002/0021804 A1 | | 2/2002 | Ledzius et al. | |
| 2005/0086532 A1 | * | 4/2005 | Lotspiech | ............. H04L 9/0822 726/4 |
| 2007/0076886 A1 | * | 4/2007 | Hori | ...................... H04L 63/068 380/277 |
| 2007/0242821 A1 | * | 10/2007 | Kim | ........................ G06F 21/10 380/28 |
| 2010/0211781 A1 | | 8/2010 | Auradkar et al. | |
| 2010/0332401 A1 | | 12/2010 | Prahlad et al. | |
| 2012/0051540 A1 | * | 3/2012 | Moon | .............. H04N 21/26606 380/200 |
| 2014/0019753 A1 | | 1/2014 | Lowry et al. | |
| 2014/0050317 A1 | | 2/2014 | Sabin | |
| 2014/0122866 A1 | | 5/2014 | Haeger et al. | |
| 2014/0281477 A1 | | 9/2014 | Nayshtut et al. | |
| 2014/0380054 A1 | | 12/2014 | Roth et al. | |

OTHER PUBLICATIONS

Yu, S., Wang, C., Ren, K., & Lou, W. (Mar. 2010). Achieving secure, scalable, and fine-grained data access control in cloud computing. In INFOCOM, 2010 Proceedings IEEE (pp. 1-9). IEEE.*

(Continued)

*Primary Examiner* — Syed Zaidi
(74) *Attorney, Agent, or Firm* — Drinker Biddle & Reath LLP

(57) ABSTRACT

In various implementations, a first device retrieves, from a memory, encrypted data encrypted using a first key. The first device transmits, to a second device, a request for an encrypted first key, where the encrypted first key is generated by encrypting the first key using a second key. The first device receives the encrypted first key. The first device transmits, to an identity and access management device (IAM), a request for an encrypted second key, where the encrypted second key is generated by encrypting the second key using a third key. The first device receives the encrypted second key. The first device decrypts the encrypted second key using the third key, decrypts the encrypted first key using the decrypted second key, and decrypts the encrypted data using the decrypted first key. The first device deletes, from its cache, the decrypted first key after a period of time.

11 Claims, 12 Drawing Sheets

(56) References Cited

OTHER PUBLICATIONS

Moon, Jinyoung, Jongyoul Park, and Euihyun Paik. "JavaCard-based two-level user key management for IP conditional access systems." Networks, 2007. ICON 2007. 15th IEEE International Conference on. IEEE, 2007.*

Moon, J., Kim, J., Park, J., Paik, E., & Park, K. (Jan. 2009). A dynamic conditional access system based on cryptographic software for the IPTV set-top box. In Consumer Electronics, 2009. ICCE'09. Digest of Technical Papers International Conference on (pp. 1-2). IEEE.*

Wang, Shyh-Yih, and Chi-Sung Laih. "Efficient key distribution for access control in pay-TV systems." Multimedia, IEEE Transactions on 10.3 (2008): 480-492.*

Boxcryptor, Product Description, retrieved from internet at <https://www.boxcryptor.com/en/boxcryptor> on Aug. 21, 2015, 3 pages.

Keynexus, Homepage, retrieved from Internet at <https://keynexus.net/> on Aug. 21, 2015, 2 pages.

* cited by examiner

SYSTEM AND METHOD FOR MANAGING CRYPTOGRAPHIC KEYS

TECHNICAL FIELD

Embodiments disclosed herein generally relate to a system and method for cryptographic key management, and more specifically to a system and method for managing cryptographic keys or encryption keys in a multi-tenant cloud computing and storage environment.

BACKGROUND

A cryptographic key management system or service typically provides the the generation, exchange, storage, use, and replacement of cryptographic or encryption keys. A typical key management system employed in a cloud computing and storage environment stores encrypted data and the key(s) used to encrypt the data in the same storage service or space. Due to this configuration, access to the storage service provides access to both the encrypted data and the key(s) needed to decrypt the data. If an unauthorized user gains access to the storage service, the unauthorized user also gains access to all the information needed to decrypt the data.

SUMMARY

Various embodiments of the disclosure provide a cryptographic key management system. In an embodiment, a method is implemented on a first computing device. The method includes retrieving, from a memory, encrypted data encrypted using a first key. The method further includes transmitting, to a second computing device, a request for an encrypted first key, where the encrypted first key is generated by encrypting the first key using a second key. The method includes receiving, from the second computing device, the encrypted first key. The method further includes transmitting, to an identity and access management device (IAM), a request for an encrypted second key, where the encrypted second key is generated by encrypting the second key using a third key. The method then includes receiving, from the IAM, the encrypted second key. The method includes decrypting the encrypted second key using the third key, decrypting the encrypted first key using the decrypted second key, and decrypting the encrypted data using the decrypted first key. Then, the method includes deleting, from a cache of the first computing device, the decrypted first key after a period of time.

In another embodiment, the method further includes retrieving, from the memory, a fourth key, and transmitting, to the second computing device, a request for an encrypted third key. The encrypted third key is generated by encrypting the third key using the fourth key. The method also includes receiving, from the second computing device, the encrypted third key; and decrypting the encrypted third key using the fourth key. In an embodiment, the fourth key is an asymmetric cryptographic key.

In yet another embodiment, the encrypted third key is stored in a hardware security module, and the hardware security module is only accessible via the second computing device.

In still another embodiment, the encrypted first key is stored in a hardware security module, and the hardware security module is only accessible via the second computing device.

In an embodiment, the first computing device includes an application server, and the second computing device includes a cryptographic key management server.

In a further embodiment, the first key is a symmetric cryptographic key, the second key is an asymmetric cryptographic key, and the third key is a symmetric cryptographic key.

In another embodiment, a method is implemented on a first computing device. The method includes receiving data for encryption, and transmitting, to an identify and access management device (IAM), a request for a key identifier based on information associated with the data. The method further includes receiving, from the IAM, the requested key identifier. The method also includes transmitting, to a second computing device, a request for an encrypted first key that is associated with the key identifier. The method includes receiving, from the second computing device, the encrypted first key. The method further includes transmitting, to the IAM, a request for an encrypted second key, and receiving, from the IAM, the encrypted second key. The method then includes decrypting the encrypted second key using a third key, and decrypting the encrypted first key using the decrypted second key. The method includes encrypting the data using the decrypted first key. Then, the method includes deleting, from a cache of the first computing device, the decrypted first key after a period of time.

In still another embodiment, the method further includes retrieving, from a memory, a fourth key, and transmitting, to the second computing device, a request for an encrypted third key. The encrypted third key is generated by encrypting the third key using the fourth key. The method includes receiving, from the second computing device, the encrypted third key.

In an embodiment, the method further includes storing the encrypted data in a memory, where the memory is only accessible via the first computing device.

In yet another embodiment, a method is implemented on a system including an application server, a cryptographic key management server (KMS), and an identity and access management device (IAM). The method includes retrieving, by the application server from a memory, encrypted data that is encrypted using a first key. The method also includes transmitting, from the application server to the KMS, a request for an encrypted first key, where the encrypted first key is generated by encrypting the first key using a second key. The method then includes transmitting, from the KMS to the application server, the encrypted first key. The method includes transmitting, from the application server to the IAM, a request for an encrypted second key, where the encrypted second key is generated by encrypting the second key using a third key. The method further includes transmitting, from the IAM to the application server, the encrypted second key. The method includes decrypting, by the application server, the encrypted second key using the third key, the encrypted first key using the decrypted second key, and the encrypted data using the decrypted first key. The method then includes deleting, from a cache of the application server, the decrypted first key after a period of time.

In an embodiment, the method further includes retrieving, by the application server from the memory, a fourth key, and transmitting, from the application server to the KMS, a request for an encrypted third key. The encrypted third key is generated by encrypting the third key using the fourth key. The method then includes transmitting, from the KMS to the application server, the encrypted third key. In an embodiment, the fourth key is an asymmetric cryptographic key.

In another embodiment, the system further includes a hardware security module (HSM) only accessible via the KMS, and the encrypted third key and the encrypted first key are stored in the HSM.

In yet another embodiment, the method further includes, at the KMS, determining whether the encrypted first key is stored in a cache of the KMS. Based on the determination that the encrypted first key is not stored in the cache of the KMS, the method includes transmitting, to the HSM, a request for the encrypted first key. The method then includes receiving, from the HSM, the encrypted first key, and storing the encrypted first key in the cache of the KMS.

In an embodiment, the first key is a symmetric cryptographic key, the second key is an asymmetric cryptographic key, and the third key is a symmetric cryptographic key.

In still another embodiment, a method is implemented on a system comprising an application server, a cryptographic key management server (KMS), and an identity and access management device (IAM). The method includes receiving, by the application server, data for encryption, and transmitting, from the application server to the IAM, a request for a key identifier based on information associated with the data. The method further includes receiving, by the application server from the IAM, the requested key identifier. The method includes transmitting, from the application server to the KMS, a request for an encrypted first key that is associated with the key identifier. The method then includes receiving, by the application server from the KMS, the encrypted first key. The method also includes transmitting, from the application server to the IAM, a request for an encrypted second key, and receiving, by the application server from the IAM, the encrypted second key. The method includes decrypting, by the application server, the encrypted second key using a third key, and the encrypted first key using the decrypted second key. The method includes encrypting, by the application server, the data using the decrypted first key, Then, the method includes deleting, from a cache of the application server, the decrypted first key after a period of time.

In another embodiment, the method includes retrieving, by the application server from a memory, a fourth key, and transmitting, from the application server to the KMS, a request for an encrypted third key. The encrypted third key is generated by encrypting the third key using the fourth key. The method further includes transmitting, from the KMS to the application server, the encrypted third key.

In yet another embodiment, the system further comprises a hardware security module (HSM) only accessible via the KMS, and the encrypted third key and the encrypted first key are stored in the HSM.

In still another embodiment, the method further includes, at the KMS, determining whether the encrypted first key is stored in a cache of the KMS. Based on the determination that the encrypted first key is not stored in the cache of the KMS, the method includes transmitting, to the HSM, a request for the encrypted first key. Then, the method includes receiving, from the HSM, the encrypted first key, and storing the encrypted first key in the cache of the KMS.

DRAWINGS

While the appended claims set forth the features of the present techniques with particularity, these techniques may be best understood from the following detailed description taken in conjunction with the accompanying drawings.

DETAILED DESCRIPTION

Various embodiments of the disclosure provide a cryptographic key management system in a cloud computing and storage environment. The key management system is configured to manage data and encryption keys of various customers or tenants who use the cloud for their computing and storage needs. For example, the key management system is configured to encrypt and store data of various customers and to generate and store cryptographic keys used to encrypt and decrypt such data. To help minimize the risk of unauthorized decryption of customer data, the key management system is further configured to store encrypted customer data separately from the cryptographic or encryption key(s) used to encrypt the data. Due to this configuration, it is unlikely for an unauthorized user to gain access to both the encrypted customer data and the encryption key(s) at the same. Because both the encrypted customer data and the encryption key(s) are needed to decrypt the customer data, unauthorized access to either the encrypted customer data or the encryption key(s) is insufficient to decrypt the customer data.

Figure 1:
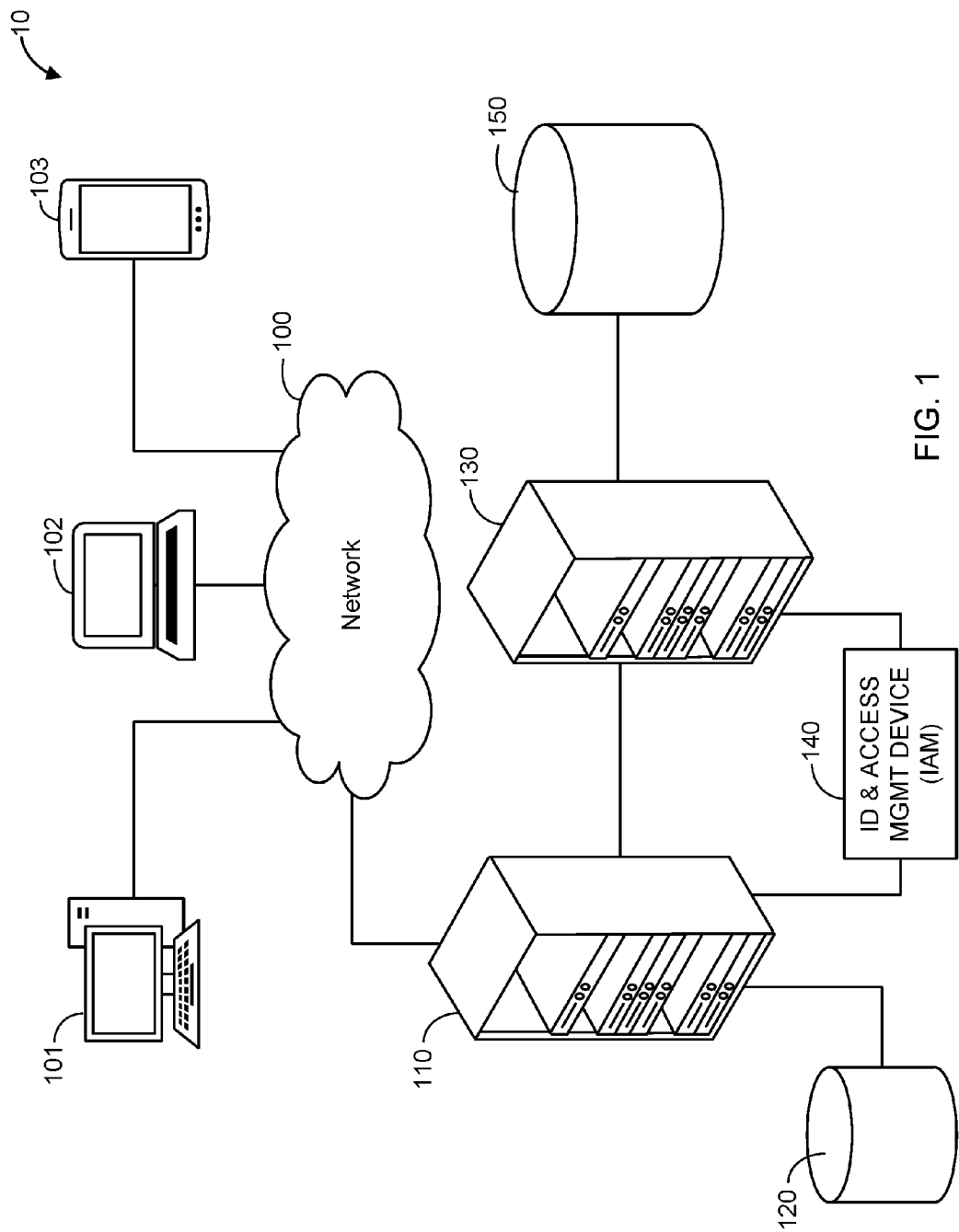
FIG. 1 is a block diagram illustrating an example of a networking environment in which various embodiments of the disclosure may be employed.

Various embodiments of the cryptographic key management system disclosed herein are implemented in a computer networking environment. Turning to FIG. 1, an example of such an environment is shown. In the networking environment 10, a first computing device 110 is communicatively linked to a network 100. Possible implementations of the network 100 include a local-area network, a wide-area network, a private network, a public network (e.g., the Internet), or any combination of these. The network 100 may include both wired and wireless components. The first computing device 110 is communicatively linked to a media storage device 120 (e.g., a memory or a redundant array of independent disks) and a second computing device 130. The first computing device 110 and the second computing device 130 are communicatively linked to an identity and access management device (IAM) 140. In an embodiment, the IAM 140 is configured to establish trust between the first computing device 110 and the second computing device 130. For example, the IAM 140 is configured to provide information necessary for the first computing device 110 and the second computing device 130 to authenticate each other. The IAM 140 is configured to authenticate the identities of the first computing device 110 and the second computing device 130 before providing such information to the first computing device 110 and/or the second computing device 130. The second computing device 130 is communicatively linked to a hardware security module (HSM) 150. Also communicatively linked to the network 100 are a third computing device 101, a fourth computing device 102, and a fifth computing device 103. For the sake of example, it is assumed that a first user operates the third computing device 101, a second user operates the third computing device 102, and a third user operates the fourth computing device 103.

In FIG. 1, the first computing device 110 and the second computing device 130 are depicted as rack-mounted servers. The third computing device 101 is depicted as a computer terminal, the fourth computing device 102 is depicted as a laptop computer, and the fifth computing device 103 is depicted as a tablet computer. However, the computing devices depicted in FIG. 1 are merely representative. Other possible implementations of a computing device include a desktop computer and a smartphone. Furthermore, while the IAM 140 is shown as a module in the current embodiment, in other embodiments, the IAM 140 may be an identity and access management server, or the IAM 140 may be a module that resides in the first computing device 110 or the second computing device 130. Although FIG. 1 depicts the media storage device 120 as a single device, in fact, the media storage device 120 may represent a cloud storage service including multiple storage devices.

For convenient reference, the first computing device 110 will also be referred to as an "application server 110," the second computing device 130 will be also be referred to as a "key management server 130," and the media storage device 120 will also be referred to as a "datastore 120." The application server 110 executes one or more applications or productivity programs. Under the control of the one or more applications productivity programs, the application server 110 interacts with the computing devices 101, 102, and 103 (e.g., client devices 101, 102, and 103) to allow the client computing devices to access data stored in the datastore 120.

As shown in FIG. 1, the datastore 120 is only accessible via the application server 110. The key management server 130 does not have direct access to the datastore 120. Furthermore, the key management server 130 is not directly linked to the network 100. In other words, the client computing devices 101, 102, and 103 cannot communicate directly with the key management server 130 and cannot gain direct access to data stored in the key management server 130. The only access to the key management server 130 through the network 100 is via the application server 110.

In an embodiment, at the start-up of the application server 110 and/or the key management server 130, the IAM 140 is configured to establish trust between the application server 110 and the key management server 130 via a mutual authentication protocol. Possible mutual authentication protocols include, for example, OAuth 2.0, HTTPS protocols (e.g., HTTP over Transport Layer Security (TLS) or HTTP over Secure Sockets Layer (SSL)), and other mutual authentication protocols used to establish trusted communication between two computing devices.

Furthermore, in the networking environment 10, HSM 150 is a storage device that permanently stores the cryptographic keys used to encrypt customer data. In an embodiment, the HSM 150 is only accessible via the key management server 130. In an embodiment, communication between the key management server 130 and the HSM 150 follow the Key Management Interoperability Protocol (KMIP). In other embodiments, communication between the key management server 130 and the HSM 150 may follow other communication protocols for retrieval of cryptographic keys from the HSM 150 by the key management server 130.

Figure 2:
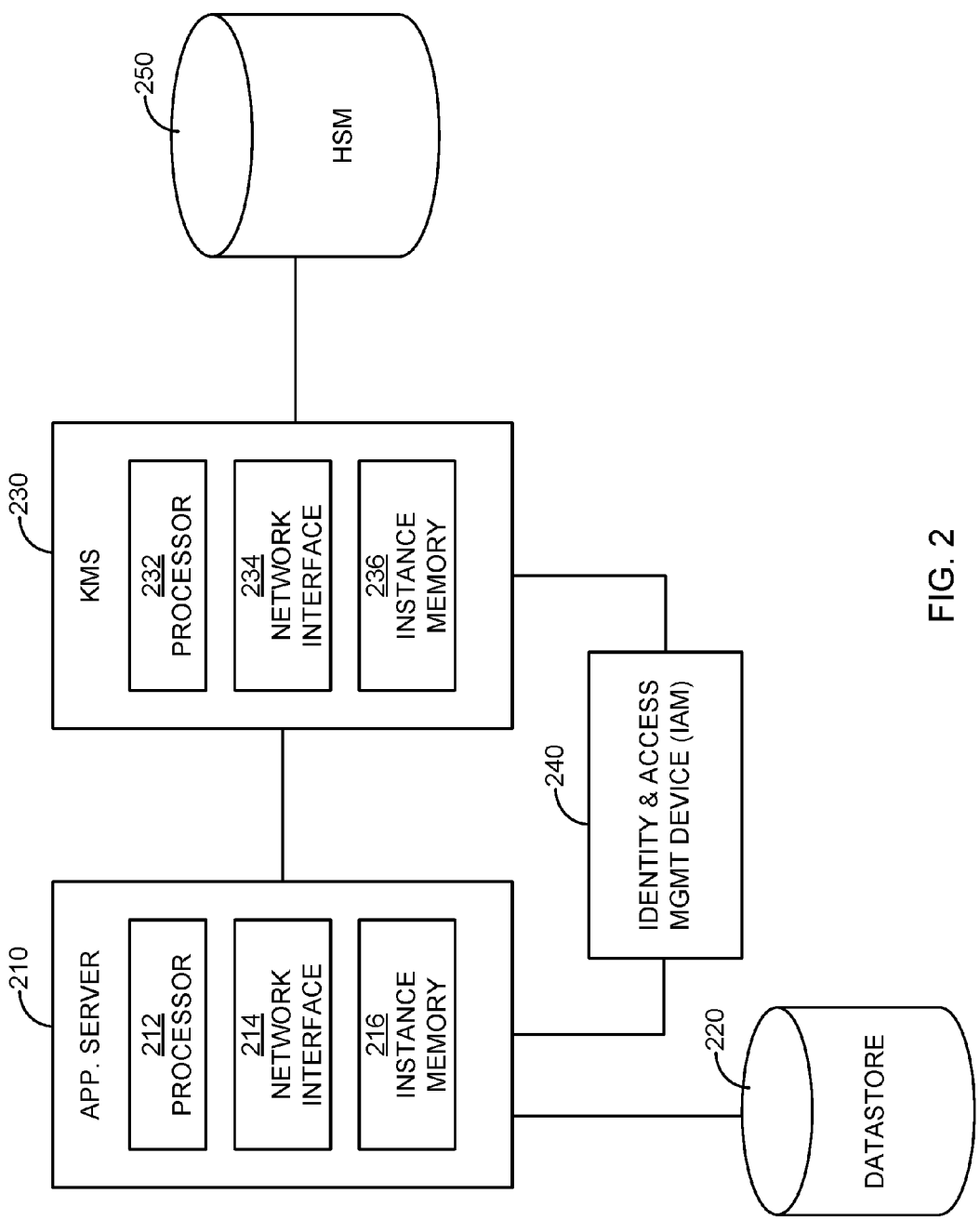
FIG. 2 is a block diagram illustrating an example cryptographic key management system, according to an embodiment.

FIG. 2 is a block diagram illustrating an example cryptographic key management system, according to an embodiment. The cryptographic key management system includes an application server 210, a datastore 220, a key management server (KMS) 230, an identity and access management device (IAM) 240, and a hardware security module (HSM) 250. The application server 210 is an example device of the first computing device 110 of FIG. 1, the datastore 220 is an example device of the media storage device 120, the key management server 230 is an example device of the second computing device 130, the IAM 240 is an example device of the IAM 140, and the HSM 250 is an example device of the HSM 150 shown in FIG. 1.

Referring to FIG. 2, the application server 210 includes one or more processors 212, a network interface 214, and an instance memory (or cache) 216. The KMS 230 includes one or more processors 232, a network interface 234, and an instance memory (or cache) 236. In various embodiments, the processor 212 and/or the processor 232 include, e.g., a microprocessor, a controller, or an application-specific integrated circuit. The instance memory 216 and/or the instance memory 236 include, e.g., a volatile memory or a random-access memory). The network interface 214 and/or the network interface 234 may be a wired or a wireless interface. Although not shown, in various embodiments, the application server 210 and/or the KMS 230 further include a secondary memory (e.g., non-volatile memory), user input devices (e.g., a keyboard, mouse, or touchscreen), a display (e.g., an organic, light-emitting diode display). The memories of the application server 210 and/or the KMS 230 store instructions and data. The one or more processors 212 and 232 execute the instructions and use the data to carry out various procedures including, in some embodiments, the methods described herein.

The datastore 220 is communicatively linked to the application server 210. In an embodiment, the datastore 220 is a database that is separate from the application server 210 but is accessible by the application server 210. In another embodiment, the datastore 220 is a cloud-based storage service or device that is accessible by the application server 210. The datastore 220 stores data that is accessible by the application server 210, including encrypted customer data that is generated by client devices (e.g., devices 101, 102, and 103 of FIG. 1). In an embodiment, the datastore 220 also stores an app-specific key (e.g., an asymmetric key such as a private key of an RSA key pair or an elliptic curve cryptography (ECC) key), which can be used to encrypt another key or keys in the system. To ensure secured key storage in the cryptographic key management system and to minimize unauthorized access to the cryptographic keys and customer data, the datastore 220 is directly accessible via the application server 210, but not the KMS 230.

In an embodiment, the IAM 240 is a hardware device or module that resides on a server that is separate from the application server 210 and the KMS 230. In another embodiment, the IAM 240 is a hardware device or module that resides on the application server 210 or the KMS 230. In yet another embodiment, the IAM 240 is an identity and access management server, which is a stand-alone server that includes one or more processors, a network interface, and memories (e.g., volatile and/or non-volatile media storage). In an embodiment, to establish trust between the application server 210 and the KMS 230, the IAM 240 is configured to authenticate the identities of the application server 210 and the KMS 230 using a mutual authentication protocol at the start-up of the application server 210 and/or the KMS 230. In various embodiments, the IAM 240 is also configured to permanently store one or more of the cryptographic keys used in the system.

In an embodiment, the HSM 250 is a hardware device that provides safe and permanent storage of cryptographic keys. For example, the HSM 250 may be a plug-in card or an external hardware device that is attached to a server or is accessible by a server. Referring to FIG. 2, the HSM 250 is accessible by the KMS 230. In response to an authenticated request by the KMS 230, the HSM 250 provides the requested key to the KMS 230. The HSM 250 is designed to be resistant to tampering and unauthorized access. In various embodiments, the HSM 250 is compliant with the Federal Information Processing Standard (FIPS) Publication 140-2, which is a computer security standard used to accredit cryptographic modules. In other embodiments, the HSM 250 is compliant with another security standard.

In an embodiment, the key management system is configured to generate one or more cryptographic keys used to encrypt and decrypt data, and some cryptographic keys can be used to encrypt other cryptographic keys. For example, for each customer account, the key management system is configured to generate a first key (which will also be referred to as a data key) and a second key (which will also be referred to as an account key). The data key is used to encrypt customer data, and the account key is used to encrypt the data key. Furthermore, the key management system is configured to generate a third key (which will also be referred to as a master key) that is specific to the cryptographic service provider operating and managing the key management system. In various embodiments, the key management system is configured to encrypt the account key using the master key, or further encrypt the once-encrypted data key and/or customer data with the master key. The key management system is further configured to generate a fourth key (which will also be referred to as an app-specific key) and encrypt the master key with the app-specific key. In an embodiment, an app-specific key is generated for each instance of an application, which may have multiple instances. In various embodiments, the key management system is configured to generate cryptographic keys using both symmetric key algorithms (e.g., Advanced Encryption Standard (AES) algorithm) or asymmetric key algorithms (e.g., RSA, ECC, or other public-key cryptographic algorithms).

In an embodiment, different service providers manage and/or operate the application server 210, the KMS 230, and the HSM 250. For example, a first service provider manages the application server 210, a second service provider (different from the first service provider) manages the KMS 230, and a third service provider (different from the first and second service providers) manages the HSM 250. With this arrangement, no one service provider has access to all the cryptographic keys or the customer data (stored in the datastore 220), and thus it is difficult for any one of the service providers to gain access to and decrypt customer data without a customer's authorization. In other embodiments, however, a different number of service providers (e.g., two, four, etc.) can manage the application server 210, the KMS 230, and the HSM 250, or some combination of the devices.

Figure 3:
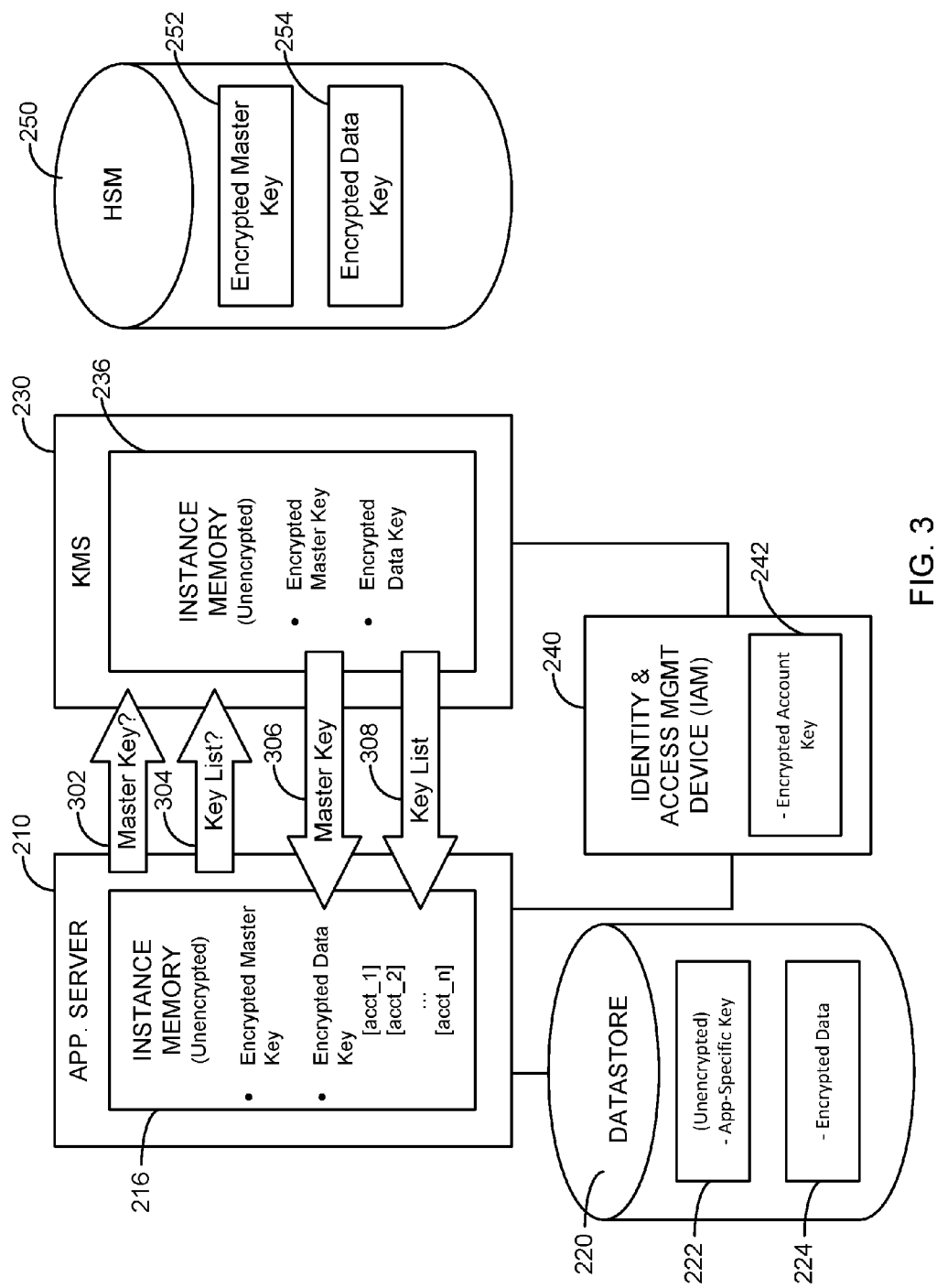
FIG. 3 is a block diagram illustrating storage and retrieval of keys in an example cryptographic key management system, according to an embodiment.

FIG. 3 is a block diagram illustrating storage and retrieval of keys in a cryptographic key management system, according to an embodiment. In FIG. 3, the storage and retrieval of cryptographic keys are discussed with reference to the key management system of FIG. 2, and description of elements having the same reference numbers is omitted for brevity. In other embodiments, however, a key management system having another suitable configuration can be used.

In an embodiment, the application server 210 is configured to execute an application (e.g., a document editor and viewer application), receive requests from client devices to retrieve customer data from the datastore 220 and store customer data (e.g., a document of a customer) in the datastore 220. The application server 210 is also responsible for the encryption and decryption of the customer data. The datastore 220 stores the encrypted customer data 226 generated by the application server 210. Also stored in the datastore 220 is an app-specific key 222, which is an asymmetric cryptographic key (e.g., a private key of an RSA key pair) in an embodiment. In another embodiment, the app-specific key 222 is a symmetric cryptographic key. In various embodiments, the application server 210 is configured to generate the app-specific key 222 and to store and retrieve the app-specific key 222 from the datastore 220.

The application server 210 is further configured to transmit requests to the KMS 230 to retrieve cryptographic keys which are cached in the instance memory 236 of the KMS 230. In an embodiment, the HSM 250 is configured to permanently store the encrypted master key 252 and the encrypted data key 254. The data key, obtained by decrypting the encrypted data key 254, is used to encrypt customer data and is specific to a customer account. In various embodiments, the application server 210 is configured to generate the data key when a new customer account is created or when a request is submitted to change an existing data key. The HSM 250 permanently stores the encrypted data keys 254 for all customers who have access to the applications or productivity programs executed by the application server 210.

In addition to the data key, each customer account is assigned an account key. The account key is used to encrypt the data key in order to generate the encrypted data key 254. In the present embodiment, the encrypted account key 242 is stored in a memory of the IAM 240. In another embodiment, the encrypted account key 242 can be stored in the datastore 220 or another storage service that is separate from the IAM 240, the application server 210, and the KMS 230. Furthermore, the encrypted account key 242 is encrypted using the master key, which is obtained by decrypting the encrypted master key 252. In various embodiments, the IAM 240 is configured to generate the account key when a new customer account is created or when a request is submitted to change an existing account key.

While HSM 250 permanently stores the encrypted master key 252 and the encrypted data key 254, a copy of the encrypted master key 252 and a copy of the encrypted data key 254 are temporarily cached in the instance memory 236 by the KMS 230 in this embodiment. Temporarily caching the cryptographic keys in the instance memory 236 allows the KMS 230 to process key requests from the application server 210 more quickly than having to retrieve the keys from the HSM 250 at every key request. In an embodiment, the KMS 230 is configured to fetch the keys from the HSM 250 at the startup of the KMS 230. The key retrieval by the KMS 230 from the HSM 250 is discussed in more detail with respect to FIG. 4.

Referring back to FIG. 3, when the application server 210 receives a request to retrieve encrypted data from the datastore 220 or to store the encrypted data in the datastore 220, the application server 210 transmits requests to the KMS 230 for cryptographic keys. However, the instance memory 216 of the application server 210 does not contain any keys at this point in time. The application server 210 transmits a request 302 for the encrypted master key to the KMS 230. After receiving the request 302 for the encrypted master key, the KMS 230 determines whether a copy of the encrypted master key is cached in its instance memory 236. Based on the determination that a copy of the encrypted master key is cached, the KMS 230 transmits the copy of the encrypted master key to the application server 210 in a response 306. The application server 210 then temporarily stores the received copy of the encrypted master key in its instance memory 216.

In addition to requesting a copy of the encrypted master key, the application server 210 transmits a request 304 for the list of encrypted data keys to the KMS 230. Upon receiving the request 304, the KMS 230 determines whether a copy of the encrypted data key list is cached in its instance memory 236. Based on the determination that a copy of the encrypted data key list is cached, the KMS 230 transmits the copy of the encrypted data key list to the application server 210 at a response 308. The application server 210 then temporarily stores the received copy of the encrypted data key list in its instance memory 216.

As shown in FIG. 3, the encrypted data 224 and the app-specific key 222 are stored in the datastore 220, the encrypted account key 242 is stored in the IAM 240, and the encrypted master key 252 and the encrypted data key 254 are stored in the HSM 250. In order to decrypt the encrypted data 224, the decrypted data key is needed. To obtain the decrypted data key, the application server 210 retrieves the app-specific key 22, the encrypted account key 242, the encrypted master key 252, and the encrypted data key 254 from their respective storage locations. Missing any of the keys would prevent the application server 210 from successfully decrypting the encrypted data key 254, which would in turn prevent the application server 210 from successfully decrypting the encrypted data 224. Because the encrypted data and the cryptographic keys are stored in various locations in the key management system, it is difficult for an unauthorized user or entity to access all the information necessary to decrypt the encrypted data. Accordingly, the key management system having the configuration as described in the present disclosure helps minimize the risk of unauthorized decryption of customer data. Furthermore, while four encryption keys are used in the present embodiment, in other embodiments, fewer or more encryption keys may be used.

Figure 4:
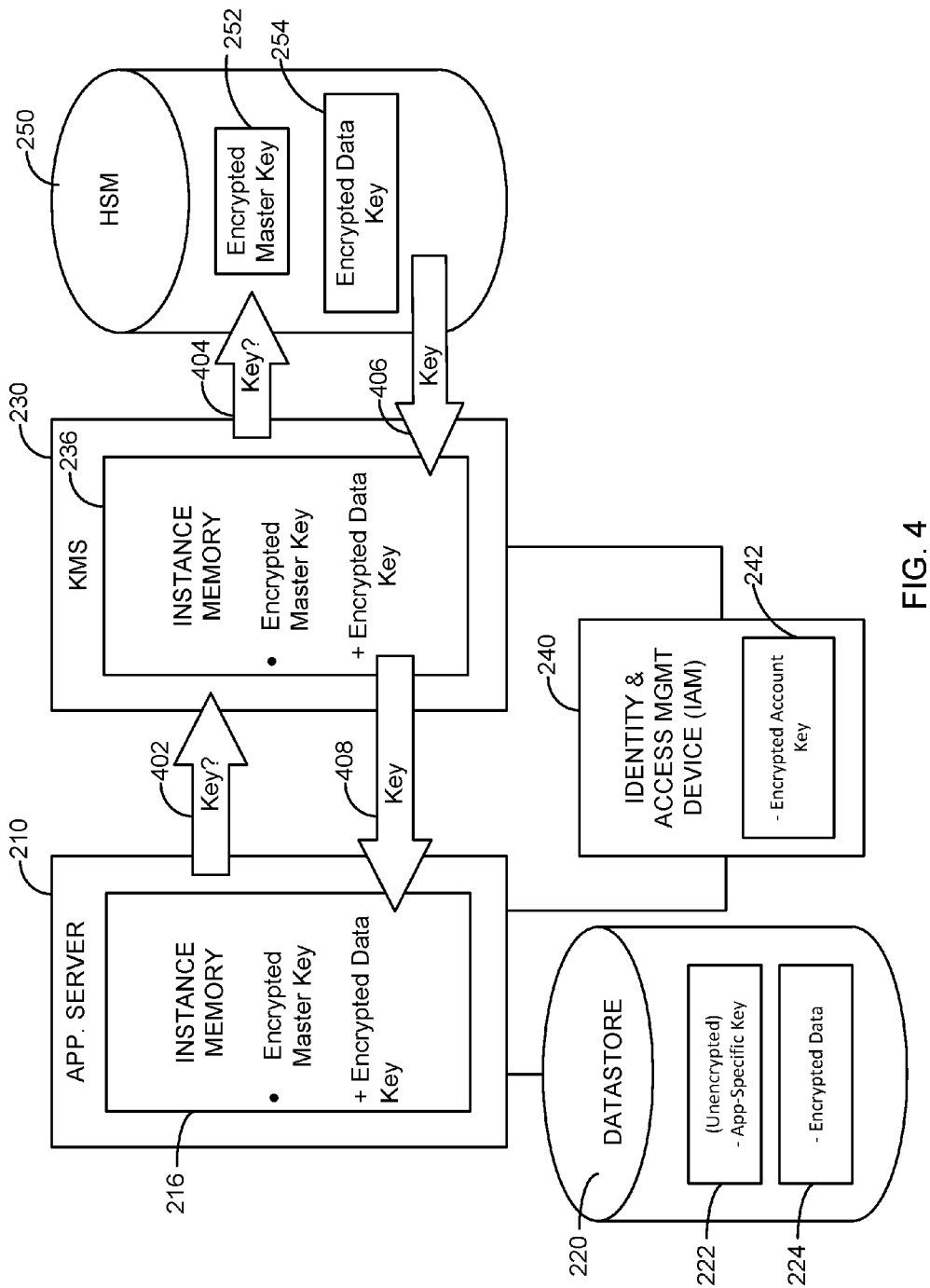
FIG. 4 is a block diagram illustrating storage and retrieval of keys in a cryptographic key management system, according to another embodiment.

FIG. 4 is a block diagram illustrating storage and retrieval of keys in a cryptographic key management system, according to another embodiment. The storage and retrieval of cryptographic keys in FIG. 4 are discussed with reference to the key management system of FIGS. 2 and 3, and description of elements having the same reference numbers is omitted for brevity.

The embodiment shown in FIG. 4 includes the retrieval of cryptographic keys by the KMS 230 from the HSM 250. The application server 210 transmits a request 402 for a cryptographic key (e.g., an encrypted data key) to the KMS 230.

After receiving the request 402 for the encrypted data key, the KMS 230 determines whether a copy of the encrypted data key is cached in its instance memory 236. Based on the determination that a copy of the encrypted data key is not in the instance memory 236, the KMS 230 transmits a request 404 to the HSM 250 to retrieve a copy of the encrypted data key 254, which is stored in the HSM 250. In an embodiment, the transfer of cryptographic keys between the KMS 230 and the HSM 250 follows the Key Management Interoperability Protocol (KMIP). In other embodiments, the transfer of the keys between the KMS 230 and the HSM 250 follows another suitable communications protocol.

Upon receiving the request 404 for the encrypted data key 254, the HSM 250 transmits a copy of the encrypted data key 254 to the KMS 230 in a response 406. The KMS 230 stores the received copy of the encrypted data key in its instance memory 236. Then, the KMS 230 transmits a copy of the encrypted data key to the application server 210 in a response 408. Upon receiving the copy of the encrypted data key, the application server 210 then temporarily caches the copy of the encrypted data key in its instance memory 216.

In an embodiment, the KMS 230 is configured to transmit a request to the HSM 250 for a copy of the encrypted master key 252 and a copy of the encrypted data key or keys 254 upon the start-up of the KMS 230. At start-up, the instance memory 236 of the KMS 230 is empty. In this case, temporarily caching a copy of the encrypted master key 252 and a copy of the encrypted data key(s) 254 in the instance memory 236 allows the KMS 230 to process key requests from the application server 210 more quickly than having to retrieve the keys from the HSM 250 at every key request. In an embodiment, after a predetermined period of time or other type of specified event, the copy of the encrypted master key 252 and/or the copy of the encrypted data key or keys 254 are deleted from the instance memory 236.

In another embodiment, the KMS 230 is configured to transmit a request to the HSM 250 for a copy of an encrypted data key when a customer changes an existing data key or when a new data key is generated for a new customer. In this case, the instance memory 236 of the KMS 230 may already contain a list of encrypted data keys that were retrieved from the HSM 250 during an earlier key request. However, because the data key is changed or the new data key is created after the prior encrypted data key retrieval, the list of encrypted data keys stored in the instance memory 236 does not include the changed data key or the new data key. The KMS 230 thus would need to submit another request to the HSM 250 to retrieve a copy of the changed data key or the new data key. Similarly, if the master key is changed, the KMS 230 would need to transmit a request to the HSM 250 to retrieve a copy of the changed master key.

Figure 5:
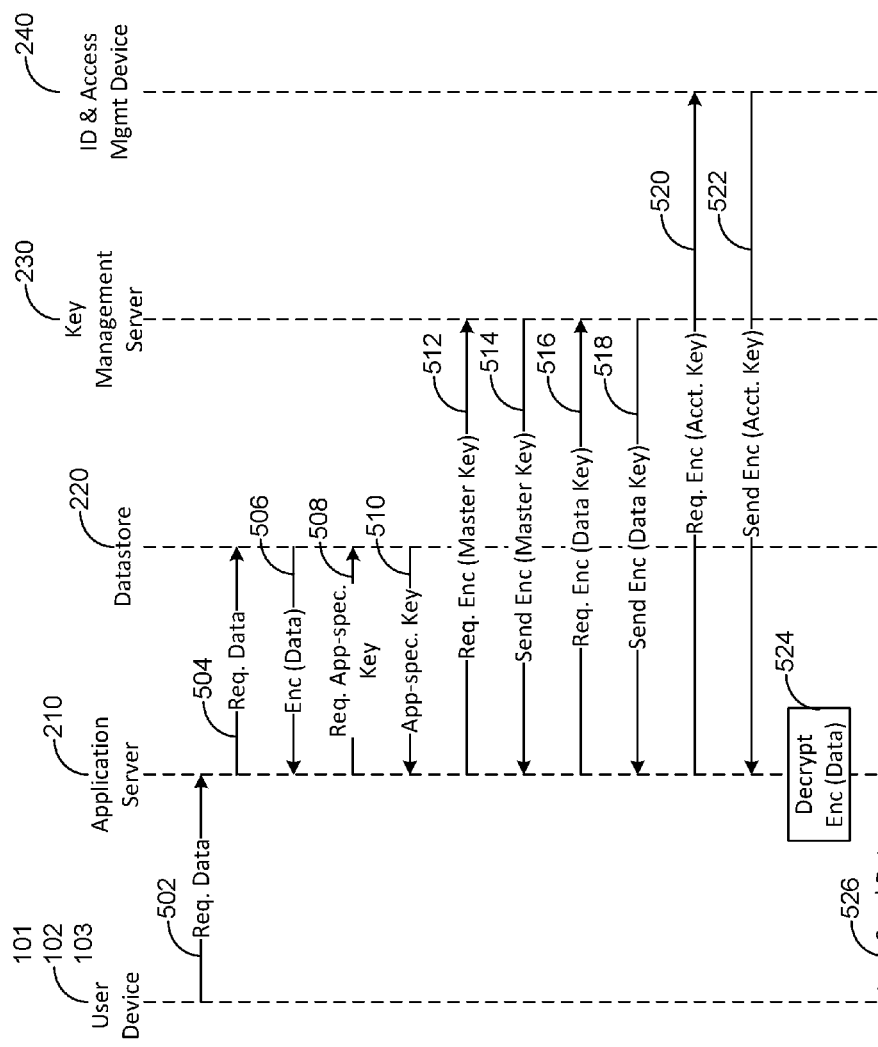
FIG. 5 is a diagram illustrating an example technique for decrypting data, according to an embodiment.

FIG. 5 is a diagram illustrating an example technique for decrypting data, according to an embodiment. The technique for decrypting data illustrated in FIG. 5 is discussed with reference to FIGS. 1 and 2, and description of elements having the same reference numbers is omitted for brevity. The technique shown in FIG. 5 involves a user device (e.g., client computing devices 101, 102, and 103 of FIG. 1), the application server 210, the datastore 220, the KMS 230, and the IAM 240.

At 502, the user device transmits to the application server 210 a request for data. The application server 210 then transmits to the datastore 220 a request for the data at 504. In response to the request for data from the application server 210, at 506, the datastore 220 transmits the encrypted data (Enc(Data)) to the application server 210. Upon receiving the encrypted data, the application server 210 must retrieve the encrypted data key, decrypted the encrypted data key, and decrypt the data using the decrypted data key.

In an embodiment, the application server 210 is configured to determine the encrypted data key that is associated with the encrypted data. To do so, the application server 210 first inspects a data token, which is a piece of metadata associated with the encrypted data, to determine the encryption scheme used to encrypt the data. Then, based on the metadata associated with the encrypted data (e.g., the data token), the application server 210 queries the IAM 240 for a Key Identifier (KI) or another account identifier associated with the encrypted data. In an embodiment, the IAM 240 is configured to store the lookup information (e.g., a lookup table) for the KIs or other account identifiers associated with encrypted data. In other embodiments, the lookup information can be stored in another device (e.g., the application server 210, KMS 230, etc). In response to the application server 210's query, the IAM 240 transmits the requested KI to the application server 210.

At 508, the application server 210 sends to the datastore 220 a request for the app-specific key, which is unencrypted. In an embodiment, the app-specific key is a private key of an asymmetric key pair (e.g., RSA key pair). In another embodiment, the app-specific key is a symmetric key. In response to the application server 210's request, the datastore 220 transmits the app-specific key to the application server 210 at 510. The app-specific key is used to decrypt the encrypted master key.

Then at 512, the application server 210 transmits to the KMS 230 a request for the encrypted master key (Enc(Master Key)). Upon receiving the request 512, the KMS 230 determines whether the requested encrypted master key is cached in its instance memory. Once the KMS 230 determines that the encrypted master key is cached, then at 514, the KMS 230 transmits a copy of the encrypted master key to the application server 210. The application server then caches the copy of the encrypted master key. The master key is used to decrypt an encrypted account key. In an embodiment, the master key is a symmetric key (e.g., an AES key). In another embodiment, the master key is an asymmetric key.

At 516, the application server 210 sends to the KMS 230 a request for the encrypted data key (Enc(Data Key)) that is associated with the KI. Upon receiving the request from the application server 210, the KMS 230 determines whether the requested encrypted data key is cached in its instance memory. Once the KMS 230 determines that the encrypted data key is cached, then at 518, the KMS 230 sends a copy of the encrypted data key to the application server 210. The application server 210 caches the copy of the encrypted data key. In an embodiment, the data key is a symmetric key (e.g., an AES key). In another embodiment, the data key is an asymmetric key.

The encrypted data key is encrypted using an account key, and the encrypted account key is stored at the IAM 240. In an embodiment, the account key is a private key of an asymmetric key pair (e.g., RSA key pair). In another embodiment, the account key is a symmetric key. To retrieve the encrypted account key (Enc(Acct. Key)), the application server 210 sends a request to the IAM 240 at 520. At 522, the IAM 240 sends a copy of the encrypted account key to the application server 210. The application server 210 caches the encrypted account key. The account key is used to decrypt the encrypted data key.

Although FIG. 5 illustrates that the application server 210 retrieves the app-specific key, the encrypted master key, the encrypted data key, and the encrypted account key in a particular order, in other embodiments, the application server 210 is configured to retrieve the cryptographic keys in any order. For example, in an embodiment, the application server 210 is configured to retrieve the encrypted data key before it retrieves the encrypted master key. In another embodiment, the application server 210 is configured to retrieve the encrypted account key from the IAM 240 before it retrieves the encrypted master key or the encrypted data key from the KMS 230.

At 524, the application server 210 decrypts the encrypted data. The application server 210 first decrypts the encrypted master key using the app-specific key and temporarily caches the decrypted master key in its instance memory. The application server 210 then decrypts the encrypted account key using the decrypted master key and temporarily caches the decrypted account key in its instance memory. The application server 210 decrypts the encrypted data key using the decrypted account key and temporarily caches the decrypted data key in its instance memory. Then, the application server 210 decrypts the encrypted data using the decrypted data key. Once the encrypted data is decrypted, at 526, the application server 210 transmits the decrypted data to the user device. In an embodiment, after a predetermined period of time (e.g., a period of time after the last operation of using the decrypted data key) or other type of specified event, the decrypted data key and the other decrypted keys are deleted from the instance memory of the application server 210. In an embodiment, the encrypted data key remains stored in the instance memory of the application server 210. In another embodiment, the encrypted data key is also deleted from the instance memory of the application server 210 after a predetermined period of time.

Figure 6:
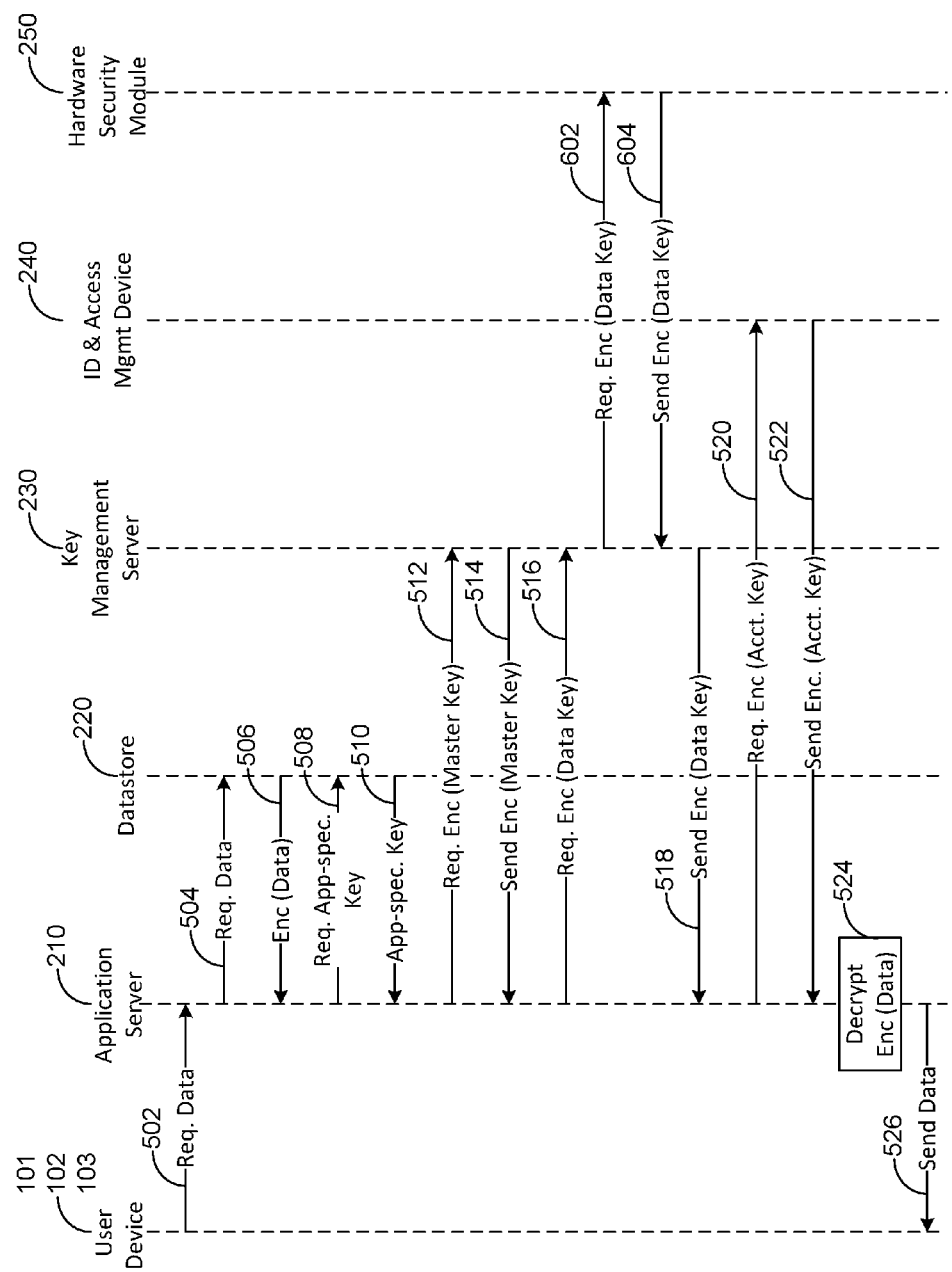
FIG. 6 is a diagram illustrating another example technique for decrypting data, according to an embodiment.

FIG. 6 is a diagram illustrating another example technique for decrypting data, according to an embodiment. The technique for decrypting data illustrated in FIG. 6 is discussed with reference to FIGS. 1, 2, and 5, and description of elements having the same reference numbers is omitted for brevity. The technique shown in FIG. 6 involves a user device (e.g., client computing devices 101, 102, and 103 of FIG. 1), the application server 210, the datastore 220, the KMS 230, the IAM 240, and the HSM 250. While FIG. 5 illustrates the technique of decrypting data when the encrypted data key is cached in the instance memory of the KMS 230, FIG. 6 illustrates the technique of decrypting data when the encrypted data key is not cached in the instance memory of the KMS 230.

Like the technique shown in FIG. 5, in FIG. 6, at 516, the application server 210 sends to the KMS 230 a request for the encrypted data key (Enc(Data Key)) that is associated with the KI of the encrypted data. Upon receiving the request from the application server 210, at 510, the KMS 230 performs a search through its instance memory to determine with the requested encrypted data key is already stored in its instance memory. If the KMS 230 determines that the requested encrypted data key is already cached, then the KMS 230 transmits the requested key to the application server 210 following the process shown in FIG. 5. However, if the KMS 230 determines that the requested encrypted data key is not cached in its instance memory, then the KMS 230 must retrieve the key from the HSM 250.

Referring to FIG. 6, at 602, the KMS 230 transmits a request to the HSM 250 for a copy of the encrypted data key, which is permanently stored in the HSM 250. In response to the request from KMS 230, the HSM 250 retrieves the requested encrypted data key and transmits a copy of the requested key to the KMS 230 at 604. In an embodiment, communication between the KMS 230 and the HSM 250 follow the Key Management Interoperability Protocol (KMIP). In other embodiments, communication between the KMS 230 and the HSM 250 may follow other communication protocols for retrieval of cryptographic keys from the HSM 250 by the KMS 230.

Upon receiving a copy of the requested encrypted data key from the HSM 250, the KMS 230 temporarily caches the copy of the encrypted data key in its instance memory. Then, the KMS 230 transmits the copy of the encrypted data key to the application server 210 at 518, and the encrypted data is decrypted as previously described with respect to FIG. 5.

In addition, if the KMS 230 determines that the encrypted master key is not cached in its instance memory in response to a request from the application server 210, the KMS 230 can retrieve the encrypted master key from the HSM 250. The retrieval for the encrypted master key from the HSM 250 is a process that is similar to the retrieval of the encrypted data key from the HSM 250 as described above.

Figure 7:
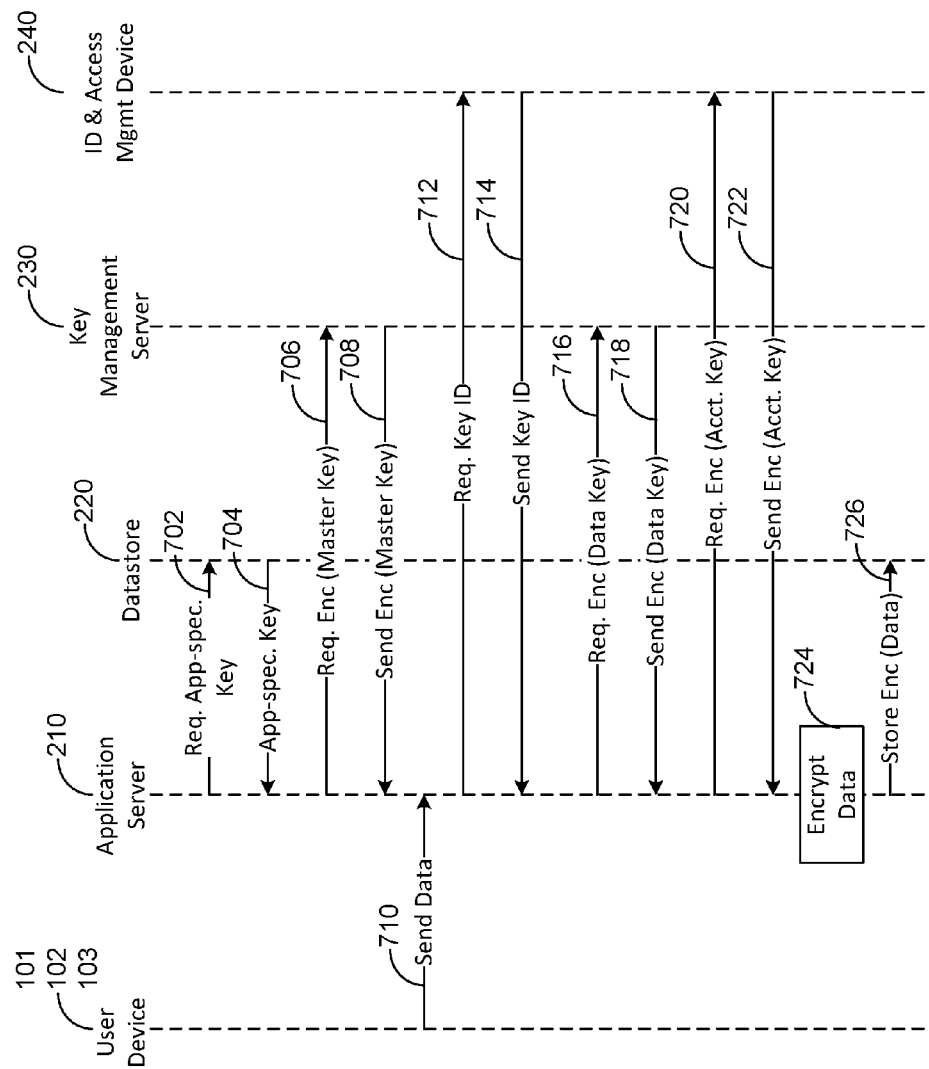
FIG. 7 is a diagram illustrating an example technique for encrypting data, according to an embodiment.

FIG. 7 is a diagram illustrating an example technique for encrypting data, according to an embodiment. The technique for encrypting data illustrated in FIG. 7 is discussed with reference to FIGS. 1 and 2, and description of elements having the same reference numbers is omitted for brevity. The technique shown in FIG. 7 involves a user device (e.g., client computing devices 101, 102, and 103 of FIG. 1), the application server 210, the datastore 220, the KMS 230, and the IAM 240.

At 702, the application server 210 sends to the datastore 220 a request for the app-specific key. In response to the application server 210's request, the datastore 220 transmits the app-specific key to the application server 210 at 704. Then at 706, the application server 210 transmits to the KMS 230 a request for the encrypted master key (Enc(Master Key)). Upon receiving the request 706, the KMS 230 determines whether the requested encrypted master key is cached in its instance memory. Once the KMS 230 determines that the encrypted master key is cached, at 708, the KMS 230 transmits a copy of the encrypted master key to the application server 210. The application server then caches the copy of the encrypted master key. Unlike the techniques shown in FIGS. 5 and 6, in the present embodiment, the application server 210 is configured to retrieve the app-specific key and the encrypted master key at start-up or prior to any customer requests, since neither the app-specific key nor the encrypted master key is particular to any customer account. Retrieving theses keys prior to customer requests may reduce the transmission and processing time once a customer request is received.

At 710, the client device transmits customer data to the application server 210 for encryption and storage. While the customer data has not been encrypted with a cryptographic key for storage, the customer data could have been encrypted for other purposes (e.g., encrypted for transmission using HTTPS protocol). After receiving the customer data, the application server 210 queries the IAM 240 to determine the required encrypted data key associated with the customer data. The application server 210 first inspects the customer data for metadata that contains information regarding the data key that should be used to encrypt the customer data for storage in the datastore 220. Then, based on the metadata associated with the customer data, at 712, the application server 210 queries the IAM 240 for a Key Identifier (KI) or another account identifier associated with the customer data. In response to the application server 210's query, the IAM 240 transmits the requested KI to the application server 210 at 714.

At 716, the application server 210 sends to the KMS 230 a request for the encrypted data key (Enc(Data Key)) that is associated with the KI. Upon receiving the request from the application server 210, at 718, the KMS 230 sends a copy of the encrypted data key, which is stored in the instance memory of the KMS 230, to the application server 210. The KMS 230 caches the copy of the encrypted data key in its instance memory.

The encrypted data key is encrypted using an account key, and the encrypted account key is stored at the IAM 240. To retrieve the encrypted account key, the application server 210 sends a request to the IAM 240 at 720. At 722, the IAM 240 sends a copy of the encrypted account key to the application server 210. The application server 210 caches the encrypted account key in its instance memory.

Although FIG. 7 illustrates that the application server 210 retrieves the app-specific key, the encrypted master key, the encrypted data key, and the encrypted account key in a particular order, in other embodiments, the application server 210 is configured to retrieve the cryptographic keys in any order. For example, in an embodiment, the application server 210 is configured to retrieve the encrypted data key before it retrieves the encrypted master key. In another embodiment, the application server 210 is configured to retrieve the encrypted account key from the IAM 240 before it retrieves the encrypted master key or the encrypted data key from the KMS 230.

At 724, the application server 210 encrypts the customer data. The application server 210 first decrypts the encrypted master key using the app-specific key and temporarily caches the decrypted master key in its instance memory. The application server 210 then decrypts the encrypted account key using the decrypted master key and temporarily caches the decrypted account key in its instance memory. Finally, the application server 210 decrypts the encrypted data key using the decrypted account key. Then, the application server 210 temporarily caches the decrypted data key in its instance memory. The application server 210 encrypts the customer data using the decrypted data key. Once the customer data is encrypted, at 726, the application server 210 transmits the encrypted data (Enc(Data)) to the datastore 220 for storage. In an embodiment, after a predetermined period of time (e.g., a period of time after the last operation of using the decrypted data key) or other specified type of event, the decrypted data key and the other decrypted keys are deleted from the instance memory of the application server 210. In an embodiment, the encrypted data key remains stored in the instance memory of the application server 210. In another embodiment, the encrypted data key is also deleted from the instance memory of the application server 210 after a predetermined period of time or other specified type of event.

Figure 8:
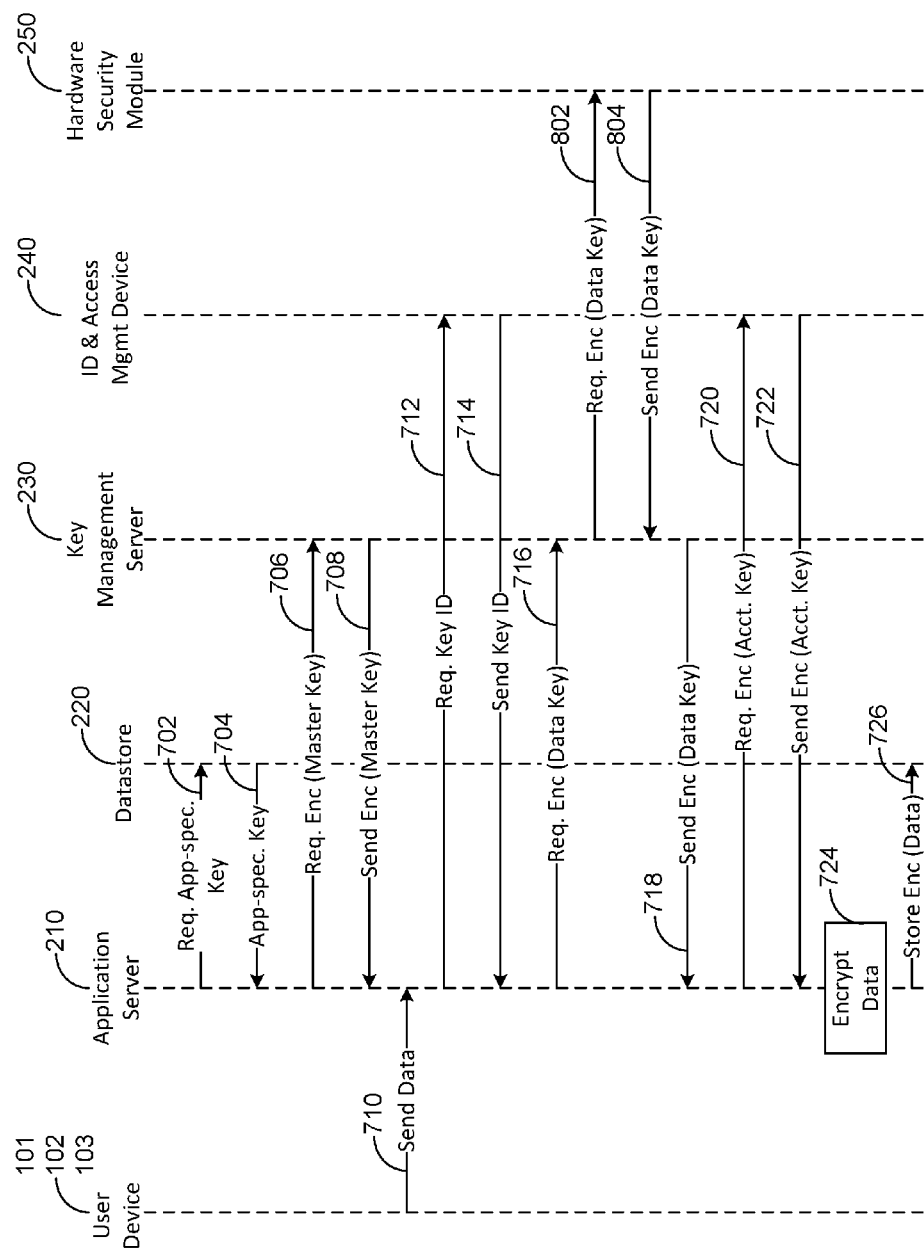
FIG. 8 is a diagram illustrating another example technique for encrypting data, according to an embodiment.

FIG. 8 is a diagram illustrating another example technique for encrypting data, according to an embodiment. The technique for encrypting data illustrated in FIG. 8 is discussed with reference to FIGS. 1, 2, and 7, and description of elements having the same reference numbers is omitted for brevity. The technique shown in FIG. 7 involves a user device (e.g., client computing devices 101, 102, and 103 of FIG. 1), the application server 210, the datastore 220, the KMS 230, the IAM 240, and the HSM 250. While FIG. 7 illustrates the technique of encrypting data when the encrypted data key is cached in the instance memory of the KMS 230, FIG. 8 illustrates the technique of encrypting data when the encrypted data key is not cached in the instance memory of the KMS 230.

Like the technique shown in FIG. 7, in FIG. 8, at 716, the application server 210 sends to the KMS 230 a request for the encrypted data key (Enc(Data Key)) that is associated with the KI of the customer data. Upon receiving the request from the application server 210, the KMS 230 performs a search through its instance memory to determine whether the requested encrypted data key is already stored in its instance memory. If the KMS 230 determines that the requested encrypted data key is already cached, then the KMS 230 transmits the requested key to the application server 210 following the process shown in FIG. 7. However, if the KMS 230 determines that the requested encrypted data key is not cached in its instance memory, then the KMS 230 must retrieve the key from the HSM 250.

Referring to FIG. 8, at 802, the KMS 230 transmits a request to the HSM 250 for a copy of the encrypted data key, which is permanently stored in the HSM 250. In response to the request from KMS 230, the HSM 250 retrieves the requested encrypted data key and transmits a copy of the requested key to the KMS 230 at 804. In an embodiment, communication between the KMS 230 and the HSM 250 follow the Key Management Interoperability Protocol (KMIP). In other embodiments, communication between the KMS 230 and the HSM 250 may follow other communication protocols for retrieval of cryptographic keys from the HSM 250 by the KMS 230.

Upon receiving a copy of the requested encrypted data key from the HSM 250, the KMS 230 temporarily caches the copy of the encrypted data key in its instance memory. Then, the KMS 230 transmits the copy of the encrypted data key to the application server 210 at 718, and the customer data is encrypted as previously described with respect to FIG. 7.

In addition, if the KMS 230 determines that the encrypted master key is not cached in its instance memory in response a request from the application server 210, the KMS 230 can retrieve the encrypted master key from the HSM 250. The retrieval for the encrypted master key from the HSM 250 is a process that is similar to the retrieval of the encrypted data key from the HSM 250 as described above.

Figure 9:
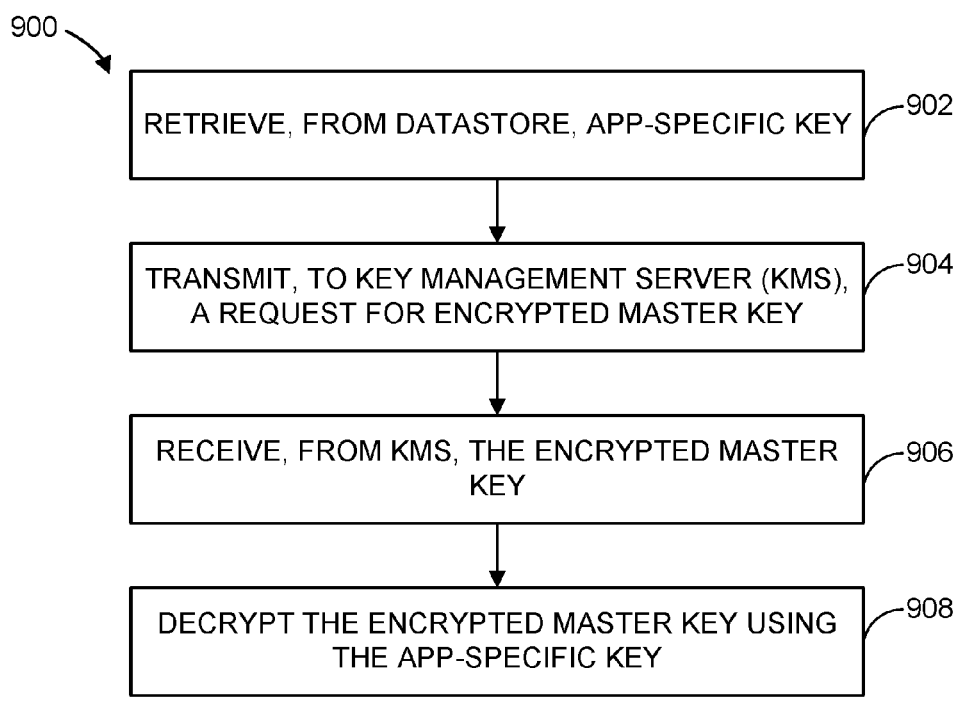
FIG. 9 is a flowchart illustrating an example process for retrieving a cryptographic key from a key management server, according to an embodiment.

FIG. 9 is a flowchart illustrating an example process for retrieving a cryptographic key from a key management server, according to an embodiment. In the present embodiment, the process 900 of FIG. 9 is discussed with reference to the systems illustrated in FIGS. 1 and 2. In other embodiments, other suitable systems can be used to perform the process illustrated in FIG. 9.

In more detail, FIG. 9 illustrates the process 900 of retrieving the encrypted master key by the application server 210. At 902, the application server 210 is configured to retrieve, from the datastore 220, an app-specific key, which is unencrypted. In an embodiment, the app-specific key is a private key of an asymmetric key pair (e.g., a RSA key pair). In another embodiment, the app-specific key is a symmetric key. At 904, the application server 210 is configured to transmit, to the KMS 230, a request for the encrypted master key. At 906, the application server 210 is configured to receive, from the KMS 230, the encrypted master key.

Then at 908, the application server 210 is configured to decrypt the encrypted master key using the app-specific key. In an embodiment, if the app-specific key is a private key of an asymmetric key pair, then the application server 210 is further configured to generate the corresponding public key to the private key. Using the public-private key pair, the application server 210 is configured to decrypt the encrypted master key.

Figure 10:
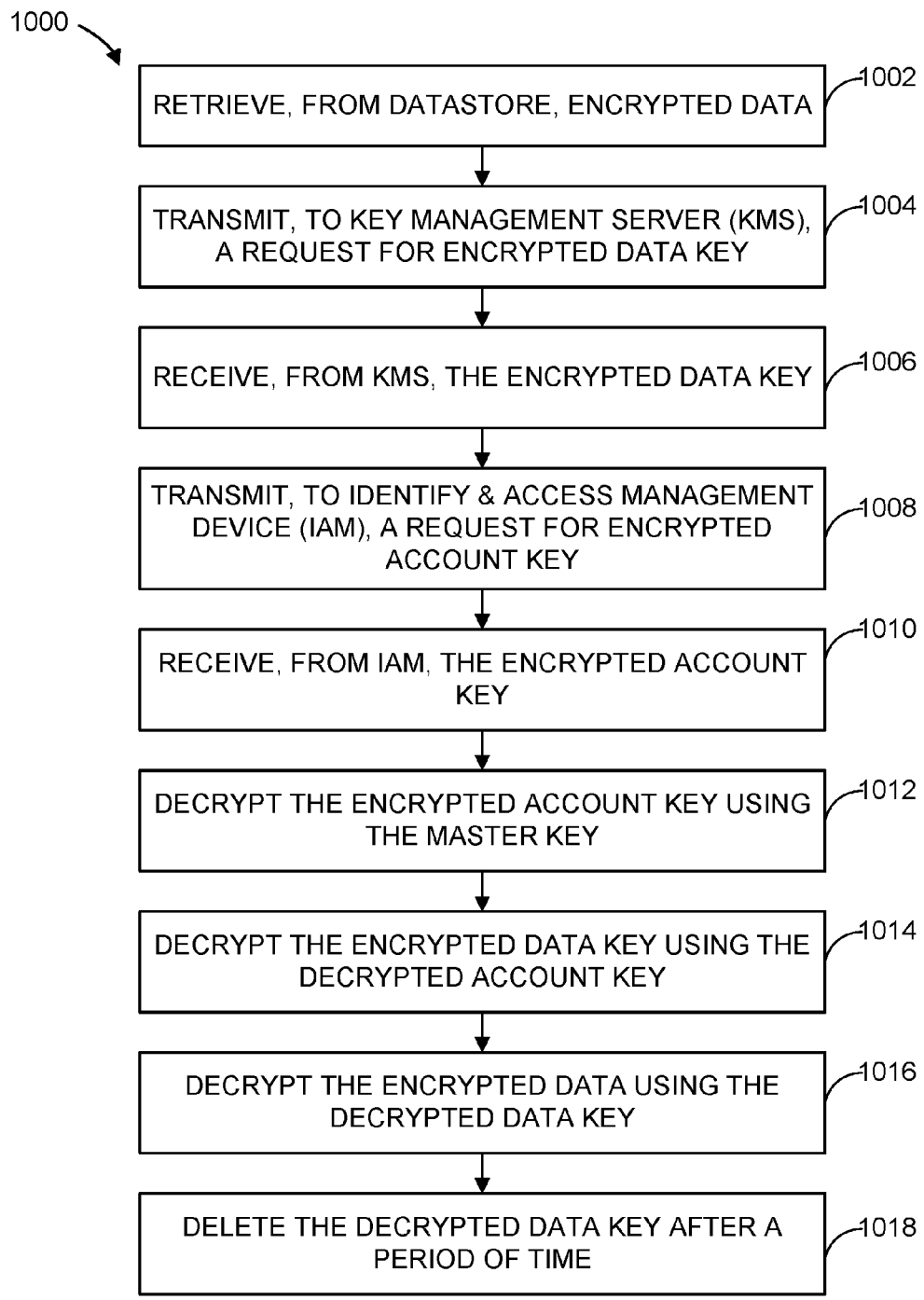
FIG. 10 is a flowchart illustrating an example process for decrypting data, according to an embodiment.

FIG. 10 is a flowchart illustrating an example process for decrypting data, according to an embodiment. In the present embodiment, the process 1000 of FIG. 10 is discussed with reference to the systems illustrated in FIGS. 1 and 2. In other embodiments, other suitable systems can be used to perform the process illustrated in FIG. 10.

At 1002, an application server (e.g., the application server 210) is configured to retrieve, from a datastore (e.g., the datastore 220), encrypted data encrypted using a data key. At 1004, the application server is configured to transmit, to a key management server (e.g., KMS 230), a request for an encrypted data key, where the encrypted data key is generated by encrypting the data key using an account key. At 1006, the application server is configured to receive, from the KMS, the encrypted data key.

Then, at 1008, the application server is configured to transmit, to the IAM, a request for an encrypted account key, where the encrypted account key is generated by encrypting the account key using a master key. In an embodiment, it is assumed that the application server has already decrypted the encrypted master key to obtain the master key. In other embodiments, however, the application server is configured to retrieve and decrypt the encrypted master key (e.g., as shown in FIG. 9). At 1010, the application server is configured to receive, from the IAM, the encrypted account key.

Using a processor of the application server, the application server is configured to decrypt the encrypted account key using the master key at 1012. The application server is then configured to decrypt, using its processor, the encrypted data key using the decrypted account key at 1014. At 1016, the application server is configured to decrypt, using its processor, the encrypted data using the decrypted data key. At 1018, the application is configured to delete, from its cache, the decrypted data key after a period of time.

Figure 11:
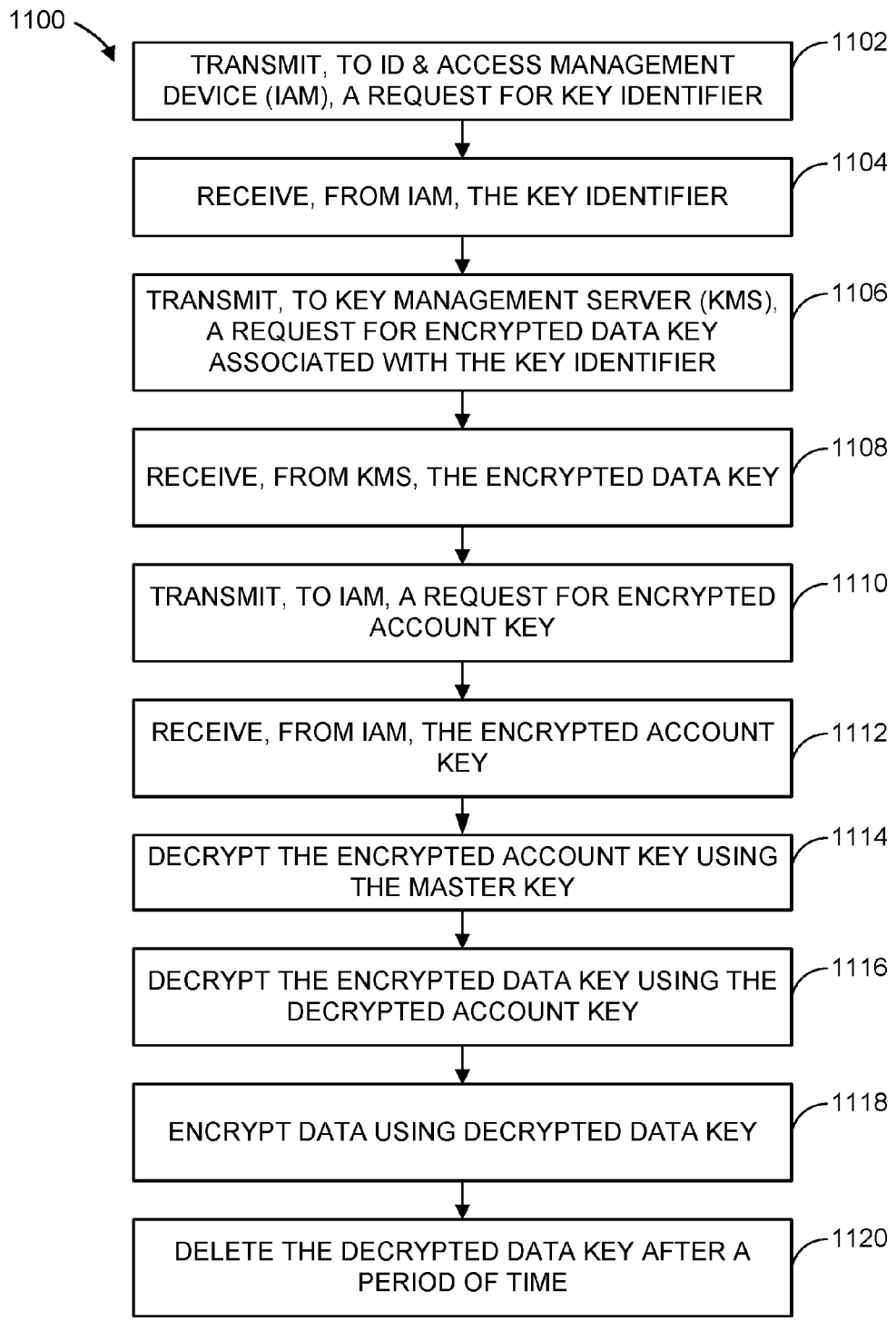
FIG. 11 is a flowchart illustrating an example process for encrypting data, according to an embodiment.

FIG. 11 is a flowchart illustrating an example process for encrypting data, according to an embodiment. In the present embodiment, the process 1100 of FIG. 11 is discussed with reference to the systems illustrated in FIGS. 1 and 2. In other embodiments, other suitable systems can be used to perform the process illustrated in FIG. 11.

After an application server (e.g., the application server 210) receives data (e.g., from a client device) for encryption, at 1102, the application server is configured to transmit, to an IAM (e.g., IAM 240), a request for a key identifier based on information or metadata associated with the data. At 1104, the application server is configured to receive, from the IAM, the requested key identifier after the IAM authenticates the request for the key identifier.

Then at 1106, the application server is configured to transmit, to a KMS (e.g., KMS 230), a request for an encrypted data key that is associated with the key identifier. At 1108, the application server is configured to receive, from the KMS, the encrypted data key.

At 1110, the application server is configured to transmit, to the IAM, a request for an encrypted account key. At 1112, the application server is configured to receive the encrypted account key from the IAM.

Using a processor of the application server, the application server is configured to decrypt the encrypted account key using a master key at 1114. In the present embodiment, it is assumed that the application server has already decrypted the encrypted master key to obtain the master key. At 1116, the application server is further configured to decrypt, using its processor, the encrypted data key using the decrypted account key. Then at 1118, the application server is configured to encrypt, using its processor, the data using the decrypted data key. Then at 1120, the application server is configured to delete, from its cache, the decrypted data key after a period of time.

In an embodiment, the application server is further configured to retrieve an app-specific key from the datastore. The application server is also configured to transmit, to the KMS, a request for the encrypted master key. The application server is configured to receive the encrypted master key from the KMS. In various embodiments, the app-specific key is an asymmetric cryptographic key (e.g., a private key of a RSA key pair).

In another embodiment, the encrypted master key and the encrypted data key are stored in a hardware security module (e.g., HSM 250). The HSM is only accessible via the KMS. In still another embodiment, the datastore is only accessible via the application server, but not the KMS.

In yet another embodiment, the master key is a symmetric cryptographic key, the account key is an asymmetric cryptographic key (e.g., a private key of a RSA key pair), and the data key is a symmetric cryptographic key (e.g., an. In other embodiments, other suitable encryption schemes can be employed for the cryptographic keys used by the key management system.

Figure 12:
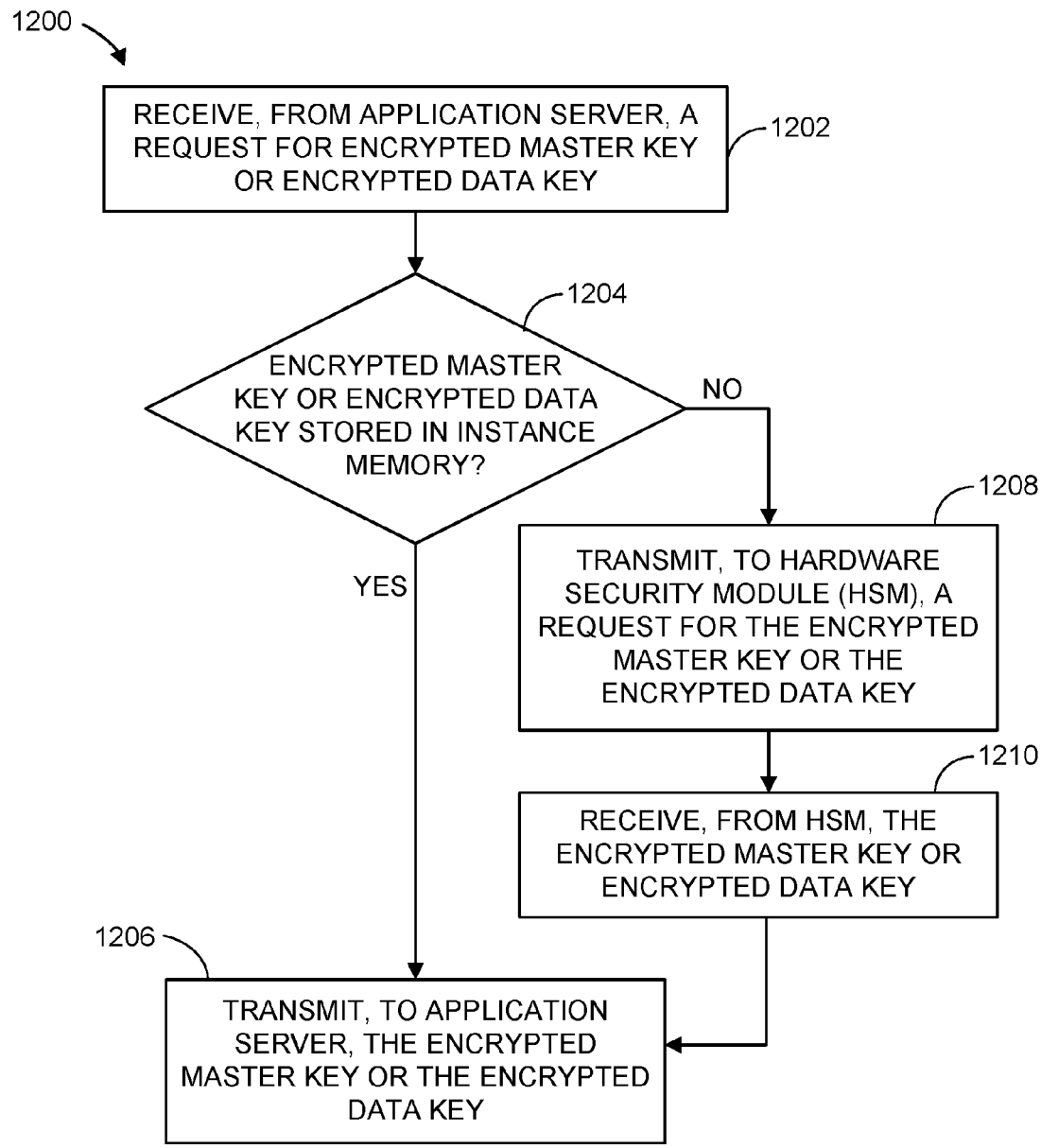
FIG. 12 is a flowchart illustrating an example process for retrieving a cryptographic key from a hardware security module, according to an embodiment.

FIG. 12 is a flowchart illustrating an example process for retrieving a cryptographic key from a hardware security module, according to an embodiment. In the present embodiment, the process 1200 of FIG. 12 is discussed with reference to the systems illustrated in FIGS. 1 and 2. In other embodiments, other suitable systems can be used to perform the process illustrated in FIG. 12.

At 1202, a KMS (e.g., the KMS 230) is configured to receive, from an application server (e.g., the application server 210), a request for a cryptographic key (e.g., an encrypted master key or an encrypted data key). At 1204, the KMS is configured to determine whether the requested key is cached or stored in its instance memory. If it is determined that the requested key is cached in the KMS's instance memory, the KMS is configured to transmit, to the application server, the requested key at 1206.

However, if it is determined that the requested key is not cached in the KMS's instance memory, then at 1208, the KMS is configured to transmit, to a HSM (e.g., the HSM 250), a request for the cryptographic key. In various embodiments, the encrypted master key and the encrypted data key are permanently stored in the HSM. At 1210, the KMS is configured to receive the requested key from the HSM. After receiving the key from the HSM, the KMS is configured to cache the requested then. Then the KMS is configured to transmit the requested key to the application server at 1206.

In various embodiments, the system described herein is configured to perform other key management functions. For example, in an embodiment, the system is configured to handle the generation and addition of cryptographic keys. In an embodiment, in response to a customer or user request, the application server is configured to generate a new data key specific to that customer account. The application server is then configured to encrypt the newly generated data key using the customer's account key and transmit the encrypted data key to the KMS. Then, the KMS is configured to transmit the encrypted data key to the HSM for permanent storage.

In another embodiment, the system is configured to handle deletion of cryptographic keys. In response to a customer or user request to delete an existing data key, the application server is configured to relay the request to the KSM. Then the KMS is configured to delete any cached copy of the encrypted data key and to transmit a request to the HSM to delete the permanent copy of the encrypted data key. For example, the KMS is configured to delete the cached copy of the encrypted data key after a time-to-live (TTL) period has expired or after the KMS operation is terminated. In another embodiment, the KMS is configured to poll the HSM to validate the encrypted data keys cached in the KMS instance memory on a TTL basis. In yet another embodiment, the KMS is configured to transmit a request to the HSM to delete the permanent copy of the encrypted data key. After receiving the delete request, the HSM is configured to delete the encrypted data key.

In still another embodiment, the system is configured to handle creation of new customer account keys (e.g., new RSA keypairs). When a new customer account is created, in an embodiment, the IAM is configured to generate the new customer account key. The IAM is then configured to transmit the customer account key to the application server for encryption. After receiving the new customer account key, the application server is configured to encrypt the account key with the master key and then transmit the encrypted account key back to the IAM. In another embodiment, the application server is configured to generate the new customer account key when a new customer account is created. Furthermore, the application server is configured to transmit metadata related to the new customer account to the IAM for key identifier mapping at the IAM. The system is then configured to generate a new data key for the new customer account and stores the newly generated data key in accordance with various embodiments discussed in the present disclosure.

In yet another embodiment, the system is configured to handle the deletion of customer account keys. The application server is configured to transmit a request to the IAM to delete the customer account key (e.g., the RSA keypair) stored at the IAM. The system is then configured to delete the encrypted data key associated with the new customer account in accordance with various embodiments discussed in the present disclosure.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor (e.g. an application specific integrated circuit (ASIC), a microprocessor, a controller, etc), a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method implemented on a first computing device, the method comprising:
   retrieving, from a memory, encrypted data encrypted using a first key;
   retrieving, from the memory, a fourth key;
   transmitting, to a second computing device, a request for an encrypted first key, wherein the encrypted first key is generated by encrypting the first key using a second key;
   receiving, from the second computing device, the encrypted first key;
   transmitting, to an identity and access management device (IAM), a request for an encrypted second key, wherein the encrypted second key is generated by encrypting the second key using a third key;
   receiving, from the IAM, the encrypted second key;
   transmitting, to the second computing device, a request for an encrypted third key, wherein the encrypted third key is generated by encrypting the third key using the fourth key;
   receiving, from the second computing device, the encrypted third key;
   decrypting the encrypted third key using the fourth key;
   decrypting the encrypted second key using the third key;
   decrypting the encrypted first key using the decrypted second key;
   decrypting the encrypted data using the decrypted first key; and
   deleting, from a cache of the first computing device, the decrypted first key after a period of time.

2. The method of claim 1, wherein the fourth key is an asymmetric cryptographic key.

3. The method of claim 1, wherein:
   the encrypted third key is stored in a hardware security module; and
   the hardware security module is only accessible via the second computing device.

4. The method of claim 1, wherein:
   the encrypted first key is stored in a hardware security module; and
   the hardware security module is only accessible via the second computing device.

5. The method of claim 1, wherein:
   the first computing device comprises an application server; and
   the second computing device comprises a cryptographic key management server.

6. The method of claim 1, wherein:
   the first key is a symmetric cryptographic key;
   the second key is an asymmetric cryptographic key; and
   the third key is a symmetric cryptographic key.

7. A method implemented on a system comprising an application server, a cryptographic key management server (KMS), and an identity and access management device (IAM), the method comprising:
   retrieving, by the application server from a memory, encrypted data that is encrypted using a first key;
   retrieving, by the application server from the memory, a fourth key;
   transmitting, from the application server to the KMS, a request for an encrypted first key, wherein the encrypted first key is generated by encrypting the first key using a second key;

transmitting, from the KMS to the application server, the encrypted first key;
transmitting, from the application server to the IAM, a request for an encrypted second key, wherein the encrypted second key is generated by encrypting the second key using a third key;
transmitting, from the IAM to the application server, the encrypted second key;
transmitting, from the application server to the KMS, a request for an encrypted third key, wherein the encrypted third key is generated by encrypting the third key using the fourth key;
transmitting, from the KMS to the application server, the encrypted third key;
decrypting, by the application server, the encrypted third key using the fourth key;
decrypting, by the application server, the encrypted second key using the third key;
decrypting, by the application server, the encrypted first key using the decrypted second key;
decrypting, by the application server, the encrypted data using the decrypted first key; and
deleting, from a cache of the application server, the decrypted first key after a period of time.

8. The method of claim 7, wherein the fourth key is an asymmetric cryptographic key.

9. The method of claim 7, wherein the system further comprises a hardware security module (HSM) only accessible via the KMS, and the encrypted third key and the encrypted first key are stored in the HSM.

10. The method of claim 7, further comprising:
at the KMS:
  determining whether the encrypted first key is stored in a cache of the KMS;
  based on the determination that the encrypted first key is not stored in the cache of the KMS, transmitting, to a hardware security module (HSM), a request for the encrypted first key;
  receiving, from the HSM, the encrypted first key; and
  storing the encrypted first key in the cache of the KMS.

11. The method of claim 7, wherein:
the first key is a symmetric cryptographic key;
the second key is an asymmetric cryptographic key; and
the third key is a symmetric cryptographic key.

* * * * *